United States Patent
Kim

(10) Patent No.: US 9,077,894 B2
(45) Date of Patent: Jul. 7, 2015

(54) METHOD AND APPARATUS FOR CAPTURING STILL IMAGE DURING PHOTOGRAPHING OR REPRODUCTION OF MOVING IMAGE

(75) Inventor: Kyoung-ae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 13/603,652

(22) Filed: Sep. 5, 2012

(65) Prior Publication Data

US 2013/0209056 A1 Aug. 15, 2013

(30) Foreign Application Priority Data

Feb. 10, 2012 (KR) ........................ 10-2012-0013806

(51) Int. Cl.
*H04N 5/77* (2006.01)
*H04N 5/232* (2006.01)
*H04N 9/82* (2006.01)

(52) U.S. Cl.
CPC ........... *H04N 5/23216* (2013.01); *H04N 5/772* (2013.01); *H04N 9/8227* (2013.01); *H04N 5/23219* (2013.01)

(58) Field of Classification Search
None
See application file for complete search history.

(56) References Cited

U.S. PATENT DOCUMENTS

| 2006/0140614 A1* | 6/2006 | Kim et al. ..................... 396/153 |
| 2008/0174681 A1* | 7/2008 | Okada et al. ............. 348/231.99 |
| 2008/0247600 A1* | 10/2008 | Date et al. ..................... 382/103 |
| 2009/0147122 A1* | 6/2009 | Kato ........................ 348/333.01 |
| 2011/0001840 A1* | 1/2011 | Ishii et al. .................. 348/222.1 |
| 2011/0242336 A1* | 10/2011 | Yamaji ....................... 348/207.2 |

* cited by examiner

*Primary Examiner* — Huy T Nguyen
(74) *Attorney, Agent, or Firm* — Drinker Biddle & Reath LLP

(57) ABSTRACT

A method of controlling a digital photographing apparatus is provided. The method includes: setting a still image capturing condition; capturing a moving image; and capturing a still image when the still image capturing condition is satisfied during photographing of the moving image.

18 Claims, 13 Drawing Sheets

METHOD AND APPARATUS FOR CAPTURING STILL IMAGE DURING PHOTOGRAPHING OR REPRODUCTION OF MOVING IMAGE

CROSS-REFERENCE TO RELATED PATENT APPLICATION

This application claims the priority benefit of Korean Patent Application No. 10-2012-0013806, filed on Feb. 10, 2012, in the Korean Intellectual Property Office, the disclosure of which is incorporated herein in its entirety by reference.

BACKGROUND

Various embodiments relate to a digital photographing apparatus, a method of controlling a digital photographing apparatus, a computer readable recording medium having recorded thereon a program for executing the method of controlling the digital photographing apparatus, an image processing apparatus, an image processing method, and a computer readable recording medium having recorded thereon a program for executing the image processing method.

In a moving image file, a plurality of frames are compressed and stored. In order to capture a moving image, frames are received and then a moving image file is generated from the frames. When a moving image is captured, an image of an object may be consecutively recorded and may be continually recorded for a predetermined period of time by only a single control input. In this regard, there is a need for a function of obtaining both a moving image and a still image of the same object.

SUMMARY

Various embodiments provide a method and apparatus for capturing a still image that is desired by a user even if the user does not input a predetermined control signal during photographing or playing of a moving image.

Various embodiments also provide a method and apparatus by which a user may actively set a condition for capturing a still image from a moving image.

According to an embodiment, there is provided a method of controlling a digital photographing apparatus, the method including setting a still image capturing condition; capturing a moving image; and capturing a still image when the still image capturing condition is satisfied during photographing of the moving image.

The still image capturing condition may include whether a face is detected or not, the method of controlling the digital photographing apparatus may further include detecting the face from each of a plurality of moving image frames during photographing of the moving image, and the capturing of the still image may include capturing the still image when the face is detected during photographing of the moving image.

The still image capturing condition may include at least one of a face size, a face direction, a face position, a face expression, and a blink.

The still image capturing condition may include object composition, the method of controlling the digital photographing apparatus may further include determining whether composition of an object of each of a plurality of moving image frames satisfies a composition set in the still image capturing condition during photographing of the moving image, and the capturing of the still image may include capturing the still image when the composition of the object of at least one of the plurality of moving image frames satisfies the composition set in the still image capturing condition.

The capturing of the moving image may include resizing an imaging signal generated by an imaging device to have a resolution of a moving image file; and generating the moving image file from the imaging signal that is resized to have the resolution of the moving image file, and the capturing of the still image may include resizing the imaging signal to have a resolution of a still image file; and generating the still image file from the imaging signal that is resized to have the resolution of the still image file.

The method may further include temporally storing the captured still image; when the moving image photographing is terminated, displaying the still image that is temporally stored; and generating and storing a still image file for storing the still image that is temporally stored, according to user's selection.

According to another embodiment, there is provided a digital photographing apparatus including an imaging device that photoelectrically transforms incident light to generate an imaging signal; a moving image file generating unit that generates a moving image file from the imaging signal; and a dual capturing unit that sets a still image capturing condition, and captures a still image when the still image capturing condition is satisfied during photographing of a moving image corresponding to the moving image file.

The still image capturing condition may include whether a face is detected or not, the digital photographing apparatus may further include a face detecting unit that detects the face from each of a plurality of moving image frames during photographing of the moving image, and the dual capturing unit may capture a still image when the face is detected during photographing of a moving image.

The still image capturing condition may include at least one of a face size, a face direction, a face position, a face expression, and a blink.

The still image capturing condition may include object composition, the digital photographing apparatus may further include a composition determining unit that determines whether composition of an object from each of a plurality of moving image frames satisfies a composition set in the still image capturing condition during photographing of the moving image, and the dual capturing unit may capture the still image when the composition of the object from at least one of the plurality of moving image frames satisfies the composition set in the still image capturing condition.

The moving image file generating unit may resize the imaging signal generated by the imaging device to have a resolution of the moving image file and may generate the moving image file from the imaging signal that is resized to have the resolution of the moving image file, and the dual capturing unit may resize the imaging signal to have a resolution of a still image file and may generate the still image file from the imaging signal that is resized to have the resolution of the still image file.

The digital photographing apparatus may further include a memory that temporally stores the captured still image; a display unit that, when the moving image photographing is terminated, stores the still image that is temporally stored; a still image file generating unit that generates a still image file for storing the still image that is temporally stored, according to user's selection; and a data storage unit that stores the still image file.

According to another embodiment, there is provided a non-transitory computer readable recording medium executed by a processor and having recorded thereon a program for executing a method of controlling a digital photographing apparatus, the controlling method including setting a still image capturing condition; capturing a moving image; and capturing a still image when the still image capturing condition is satisfied during photographing of the moving image.

According to another embodiment, there is provided a method of processing an image, the method including setting a still image capturing condition; playing a moving image file; and when the still image capturing condition is satisfied during the playing of the moving image file, generating a still image file from a moving image frame of the moving image.

The still image capturing condition may include at least one of whether a face is detected or not, a face size, a face direction, a face position, a face expression, and a blink, wherein the method of processing an image further may include detecting a face from each of a plurality of moving image frames during the playing of a moving image file.

The still image capturing condition may include object composition, the method of processing the image may further include determining whether composition of an object from each of a plurality of moving image frames satisfies a composition set in the still image capturing condition during the playing of the moving image file, and the generating of the still image file may further include capturing a still image when the composition of the object from at least one of the plurality of moving image frames satisfies the composition set in the still image capturing condition.

According to another embodiment, there is provided an apparatus for processing an image, the apparatus including a moving image file playing unit that decodes and plays a moving image file; and a dual capturing unit that sets a still image capturing condition, and captures a still image when the still image capturing condition is satisfied during the playing of the moving image file.

The still image capturing condition may include at least one of whether a face is detected or not, a face size, a face direction, a face position, a face expression, and a blink, and the apparatus may further include a face detecting unit that detects a face from each of a plurality of moving image frames during the playing of the moving image file.

The still image capturing condition may include object composition, the apparatus may further include a composition determining unit that determines whether composition of an object from each of a plurality of moving image frames satisfies a composition set in the still image capturing condition during the playing of the moving image file, and the dual capturing unit may capture the still image when the composition of the object from at least one of the plurality of moving image frames satisfies the composition set in the still image capturing condition.

According to another embodiment, there is provided a non-transitory a computer readable recording medium executed by a processor and having recorded thereon a program for executing a method of processing an image, the image processing method including setting a still image capturing condition; playing a moving image file; and generating a still image file from a moving image frame of the moving image file when the still image capturing condition is satisfied during the playing of the moving image file.

BRIEF DESCRIPTION OF THE DRAWINGS

The above and other features and advantages will become more apparent by describing in detail exemplary embodiments thereof with reference to the attached drawings in which.

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

Certain embodiments are described more fully with reference to the accompanying drawings, in which various inventive aspects and features are shown. In the following description, various features are described, and a detailed description of certain other features that are obvious to one of ordinary skill in the art are not provided to avoid obscuring the inventive subject matter.

The specification and drawings are provided only for illustrative purposes, and do not limit the scope of the present disclosure, which should be defined by the claims. Unless otherwise defined, terms used herein have the meaning as commonly understood by one of ordinary skill in the art to which this invention belongs. It will be further understood that terms should be interpreted as having a meaning that is consistent with their meaning in the context of the relevant art and will not be interpreted in an idealized or overly formal sense unless expressly so defined herein.

Figure 1:
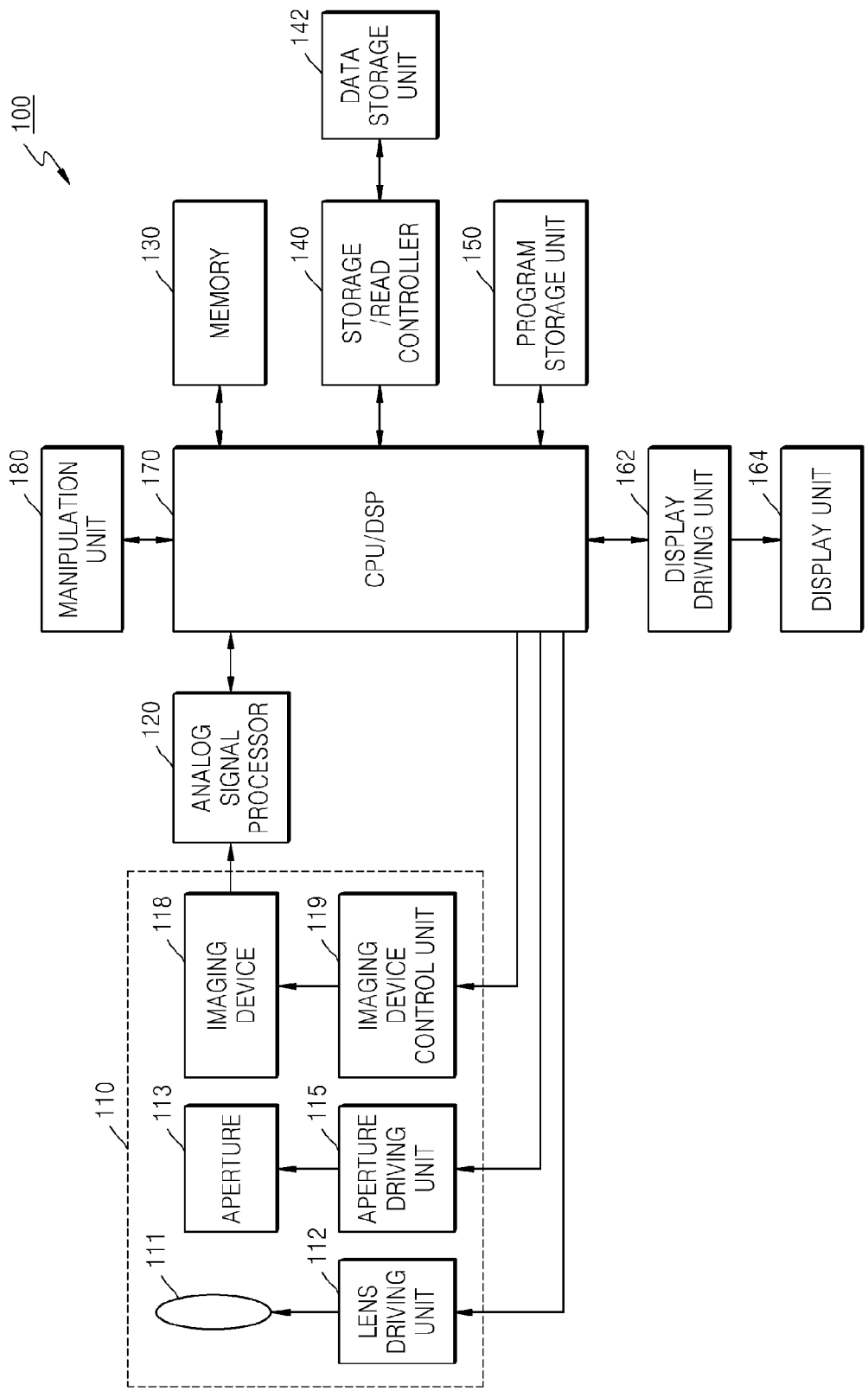
FIG. 1 is a block diagram of a digital photographing apparatus, according to an embodiment.

FIG. 1 is a block diagram of a digital photographing apparatus 100, according to an embodiment.

In the present embodiment, referring to FIG. 1, the digital photographing apparatus 100 includes a photographing unit 110, an analog signal processor 120, a memory 130, a storage/read controller 140, a data storage unit 142, a program storage unit 150, a display driving unit 162, a display unit 164, a central processing unit/digital signal processor (CPU/DSP) 170, and a manipulating unit 180.

The overall operation of the digital photographing apparatus 100 is controlled by the CPU/DSP 170. The CPU/DSP 170 provides a control signal for operating individual elements, such as a lens driving unit 112, an aperture driving unit 115, an imaging device control unit 119, and the like.

The photographing unit 110, which is an element for generating an electric image signal from incident light, includes a lens 111, the lens driving unit 112, an aperture 113, the aperture driving unit 115, an imaging device 118, and the imaging device control unit 119.

The lens 111 may include a plurality of groups of lenses or a plurality of lenses. The position of the lens 111 is controlled by the lens driving unit 112. The lens driving unit 112 may control the position of the lens 111 according to a control signal from the CPU/DSP 170.

The aperture 113, whose degree of opening may be controlled by the aperture driving unit 115, may adjust an amount of light incident onto the imaging device 118.

An optical signal that has passed the lens 111 and the aperture 113 forms an image of a subject upon reaching a light receiving surface of the imaging device 118. A charge coupled device (CCD) or a complementary metal oxide semiconductor image sensor (CIS) for converting an optical signal to an electric signal may be used as the imaging device 118. A sensitivity of the imaging device 118 may be controlled by the imaging device control unit 119. The imaging device control unit 119 may control the imaging device 118 in real time according to a control signal automatically generated in response to an input image signal, or a control signal manually input by a user.

An exposure time of the imaging device 118 is controlled using a shutter (not shown). The shutter may be a mechanical shutter for adjusting light incidence by moving the screen or may be an electronic shutter for adjusting exposure by supplying an electric signal to the imaging device 118.

The analog signal processor 120 may perform noise reduction processing, gain adjustment, waveform shaping, analog-to-digital conversion, or the like on an analog signal from the imaging device 118.

The signal processed by the analog signal processor 120 may be input to the CPU/DSP 170 directly or via the memory 130. The memory 130 may serve as a main memory of the digital photographing device 100, and temporarily store information required during an operation of the CPU/DSP 170. The program storage unit 150 may store a program for operating the digital photographing apparatus 100, such as an operating system, an application system, and the like.

The digital photographing apparatus 100 may include the display unit 164 for displaying an operation status or image information captured by the digital photographing device 100. The display unit 164 may provide visual information and/or auditory information to the user. To provide visual information, the display unit 164 may include, for example, a liquid crystal display (LCD) panel, an organic light-emitting display (OLED) panel, or the like. The display unit 164 may be a touch screen.

The display driving unit 162 may provide a driving signal to the display unit 164.

The CPU/DSP 170 may process an input image signal, and may control each element of the digital photographing apparatus 100 according to the input image signal or an external input signal. The CPU/DSP 170 may reduce noise of the input image signal, and may perform image signal processing for image quality improvement, for example, gamma correction, color filter array interpolation, color matrix, color correction, and color enhancement. Compression may be performed on image data generated from the image signal processing for image quality improvement to generate an image file, from which the image data may also be restored. A compression format of the image data may be reversible or irreversible. Appropriate examples of the compression format for still images are a Joint Photographing Experts Group (JPEG) format, a JPEG 2000 format, and the like. For moving pictures, a plurality of frames may be compressed according to a Moving Picture Experts Group (MPEG) standard, to generate a moving picture file. The image file may be created according to an Exchangeable image file format (Exif) standard.

Image data output from the CPU/DSP 170 may be input to the storage/read controller 140 directly or via the memory 130. The storage/read controller 140 may store the image data in the data storage unit 142 automatically or according to a signal input from the user. The storage/read controller 140 may read image data from the image file stored in the data storage unit 142, and may provide the image data to the display driving unit 162 via the memory 130 or another path to display the image on the display unit 164. The data storage unit 142 may be a separable component or a built-in component of the digital photographing apparatus 100.

The CPU/DSP 170 may also perform obscuring, coloring, blurring, edge enhancing, image analysis processing, image recognition, image effect processing, and the like. The image recognition may be a face recognition process, a scene recognition process, or the like. The CPU/DSP 170 may perform a display image signal process for displaying on the display unit 164. For example, brightness level adjustment, color correction, contrast adjustment, contour enhancing, screen dividing, creation, and composition of images, such as a character image, may be performed. The CPU/DSP 170 may perform a predetermined image signal process on image data to be displayed on an external monitor connected thereto, and transfer the processed image data to display a corresponding image on the external monitor.

The CPU/DSP 170 may execute a program stored in the memory 130 that serves as a program storage unit. The CPU/DSP 170 may include an extra module for generating a control signal for auto-focusing, zoom ratio changes, focus shifting, auto-exposure correction, and the like, to provide the control signal to the aperture driving unit 115, the lens driving unit 112, and the imaging device control unit 119, and may control components of the digital photographing apparatus 100, such as the shutter, a strobe light, and the like.

The manipulation unit 180 is an element via which the user may input a control signal. The manipulation unit 180 may include a variety of functional buttons, for example, a shutter-release button for inputting a shutter-release signal for exposing the imaging device 118 to light for a predetermined time to capture an image, a power button for inputting a control signal for controlling powering on or off, a zoom button for widening or narrowing an angle of view according to an input, a mode selection button, and other buttons for photographing set value adjustment. The manipulation unit 180 may be embodied in any form that allows a user to input a control signal, for example, as a button, a keyboard, a touch pad, a touch screen, a remote controller, or the like.

Figure 2:
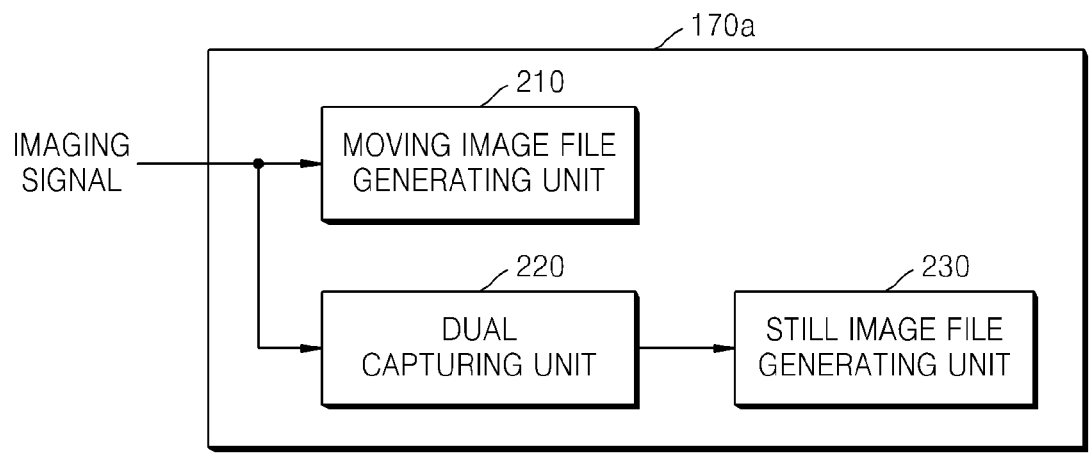
FIG. 2 is a block diagram of a central processing unit/digital signal processor (CPU/DSP), according to an embodiment.

FIG. 2 is a block diagram of a CPU/DSP 170*a*, according to an embodiment. The CPU/DSP 170*a* according to the present embodiment includes a moving image file generating unit 210, a dual capturing unit 220, and a still image file generating unit 230.

The moving image file generating unit 210 generates a moving image file from an imaging signal generated by the imaging device 118. The imaging signal may be a signal that is generated from the imaging device 118 and is processed by the analog signal processor 120. The moving image file generating unit 210 may generate frames to be included in the moving image from the imaging signal, may code the frames according to a standard, for example, Moving Picture Experts Group 4 (MPEG4), H.264/AVC, a windows media video (WMV), or the like, and may video-compress the frames to generate a moving image file by using the compressed moving image. The moving image file may be generated in various forms such as mpg, mp4, 3gpp, avi, asf, mov, or the like.

The dual capturing unit 220 captures a still image when an imaging signal satisfies a still image capturing condition during photographing of a moving image. The dual capturing unit 220 may set the still image capturing condition according to a user's input. The still image capturing condition may be a condition based on, for example, an object type, an object shape, object composition, an object color, object brightness, and the like. The dual capturing unit 220 automatically captures a still image when the imaging signal satisfies the still image capturing condition during playing of a moving image file, even if a shutter-release signal is not input. The dual capturing unit 220 may continually analyze input image during photographing of a moving image to capture at least one still image.

According to an embodiment, the dual capturing unit 220 may perform continuous photographing when the input image data satisfies the still image capturing condition. For example, when the image data satisfies the still image capturing condition, the dual capturing unit 220 may continually capture a plurality of still images.

According to an embodiment, the dual capturing unit 220 captures a still image from the imaging signal generated by the imaging device 118. A still image is likely to have higher resolution than a moving image. In this regard, according to the present embodiment, the still image may be captured from the imaging signal generated by the imaging device 118 instead of from a moving image frame, and thus the still image having high quality may be captured during photographing of a moving image.

The still image file generating unit 230 generates a still image file from the still image captured by the dual capturing unit 220. According to an embodiment, the still image captured by the dual capturing unit 220 may be temporally stored in the memory 130 (refer to FIG. 1) or the like and then stored in a still image file after playing of a moving image is terminated. According to another embodiment, when the dual capturing unit 220 captures a still image, the still image file generating unit 230 may directly generate a still image file during photographing of a moving image. The still image file generating unit 230 may store the still image file in the data storage unit 142 (refer to FIG. 1).

According to the present embodiment, a user may previously set the still image capturing condition prior to the moving-image photographing, and the digital photographing apparatus 100 may automatically capture a still image as long as the still image capturing condition is satisfied. Thus, a still image having a desired condition may be captured without any particular manipulation during photographing of a moving image. In addition, the still image may be captured without any input of a control signal during photographing of a moving image, still image, thereby preventing shake of the digital photographing apparatus 100, which may be generated by pushing a button or manipulation for inputting a capturing control signal.

Figure 3:
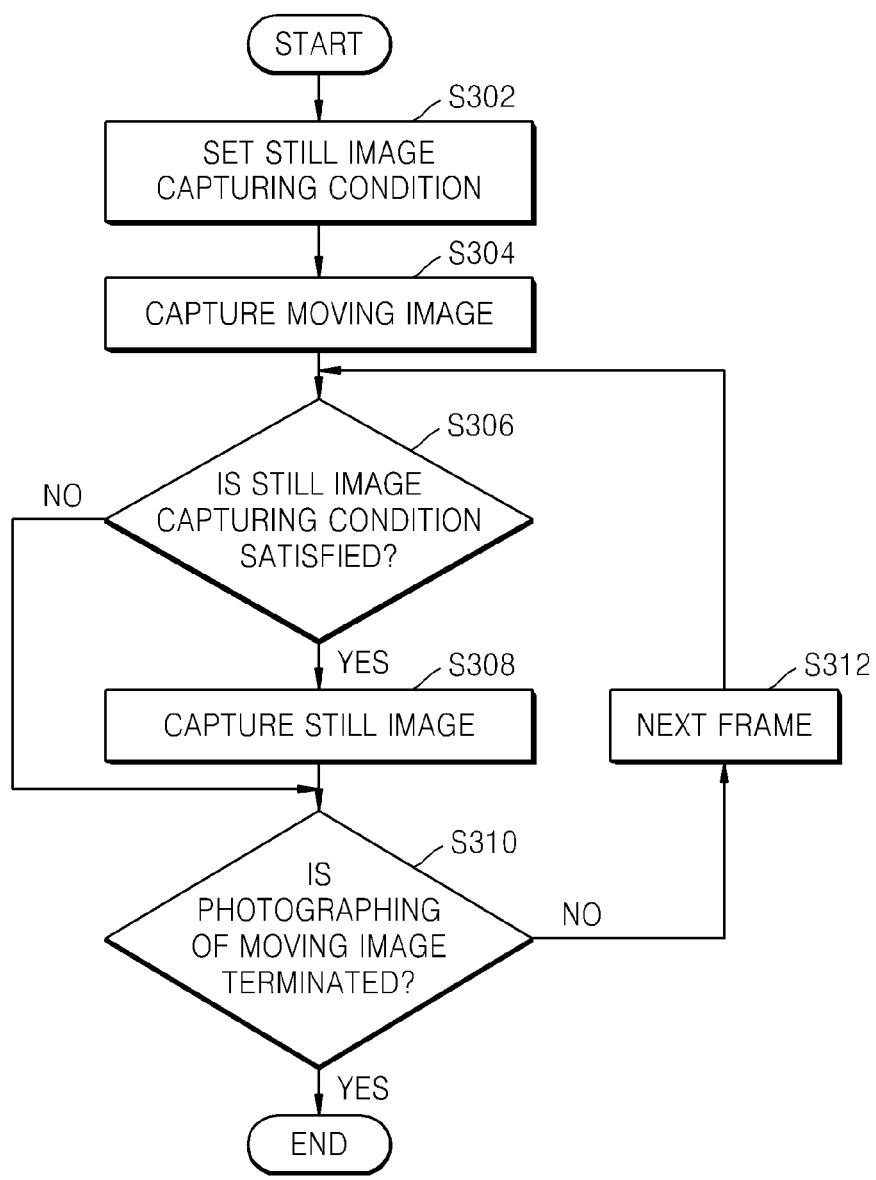
FIG. 3 is a flowchart of a method of controlling a digital photographing apparatus, according to an embodiment.

FIG. 3 is a flowchart of a method of controlling a digital photographing apparatus, according to an embodiment. The controlling method according to the present embodiment may be performed when a user selects a mode in which a still image is automatically captured during photographing of a moving image.

In the controlling method according to the present embodiment, a still image capturing condition is set according to a user's input (S302). The still image capturing condition may be a condition based on, for example, an object type, an object shape, object composition, an object color, object brightness, and the like.

Then, when moving-image photographing begins (S304), whether input image data satisfies the still image capturing condition is determined during photographing of a moving image (S306). In this case, the input image data may be a moving image frame that is generated from the imaging signal generated by the imaging device 118 (refer to FIG. 1). In the controlling method, when the input image data satisfies the still image capturing condition (S306), a still image is captured (S308). Operations S306 and S308 may be repeated until the moving-image photographing is terminated (S310) and may be repeated on a frame-by-frame basis during photographing of a moving image (S312). According to another embodiment, operation S306 of determining whether the image data satisfies the still image capturing condition may be performed in units of a predetermined number of frames instead of on a frame-by-frame basis.

Figure 4:
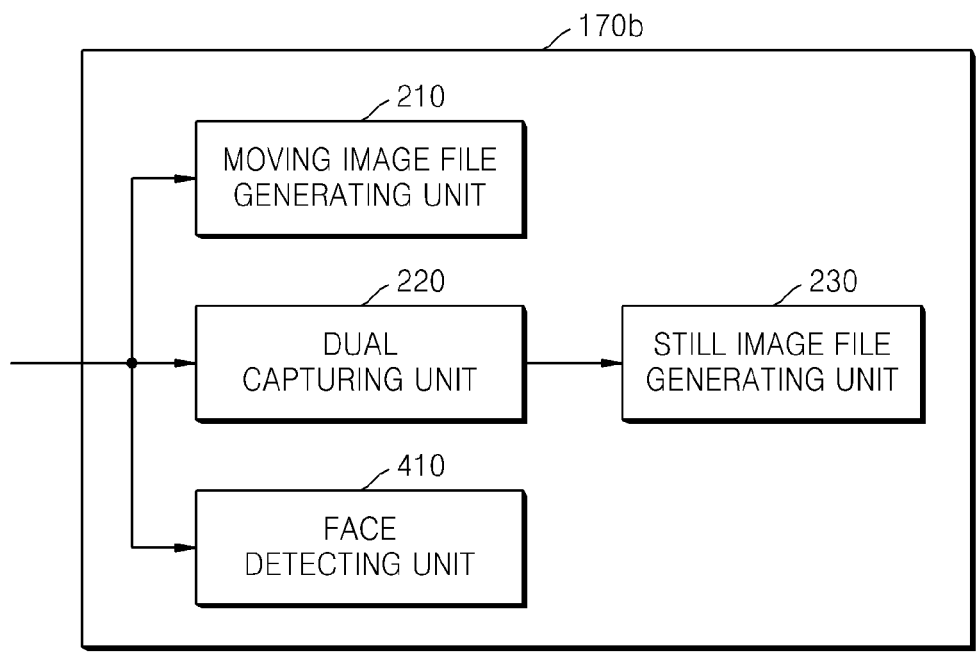
FIG. 4 is a block diagram of a CPU/DSP, according to another embodiment.

FIG. 4 is a block diagram of a CPU/DSP 170b, according to another embodiment. The CPU/DSP 170b according to the present embodiment includes the moving image file generating unit 210, the dual capturing unit 220, the still image file generating unit 230, and a face detecting unit 410.

According to another embodiment, the digital photographing apparatus 100 may detect a face from image data and may capture a still image when the detected face satisfies a still image capturing condition that is set by a user.

The moving image file generating unit 210 generates a moving image file from an imaging signal generated by the imaging device 118.

The dual capturing unit 220 sets the still image capturing condition according to a user's input and captures the still image when the still image capturing condition is satisfied during photographing of a moving image.

The face detecting unit 410 detects a face from image data corresponding to the imaging signal. According to an embodiment, the face detecting unit 410 may detect information about a face size, a face position, face expression, a face direction, blink, and the like. According to an embodiment, the face detecting unit 410 may perform a face recognition operation for determining whether the detected face corresponding to face information that is previously stored by using the face information.

The still image file generating unit 230 may generate a still image file from the still image captured by the dual capturing unit 220.

Figure 5:
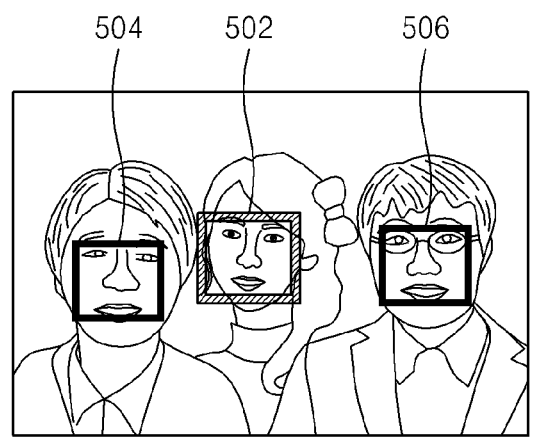
FIG. 5 is a diagram of a screen of a digital photographing apparatus, according to another embodiment.

FIG. 5 is a diagram of a screen of the digital photographing apparatus 100, according to another embodiment.

According to another embodiment, a still image capturing condition may correspond to whether a face is detected or not. For example, the dual capturing unit 220 may capture a still image from image data corresponding to an imaging signal when a face is captured. To this end, referring to FIG. 5, the face detecting unit 410 may detect a face, and face regions 502, 504, and 506 may be displayed on a screen of the display unit 164.

Figure 6:
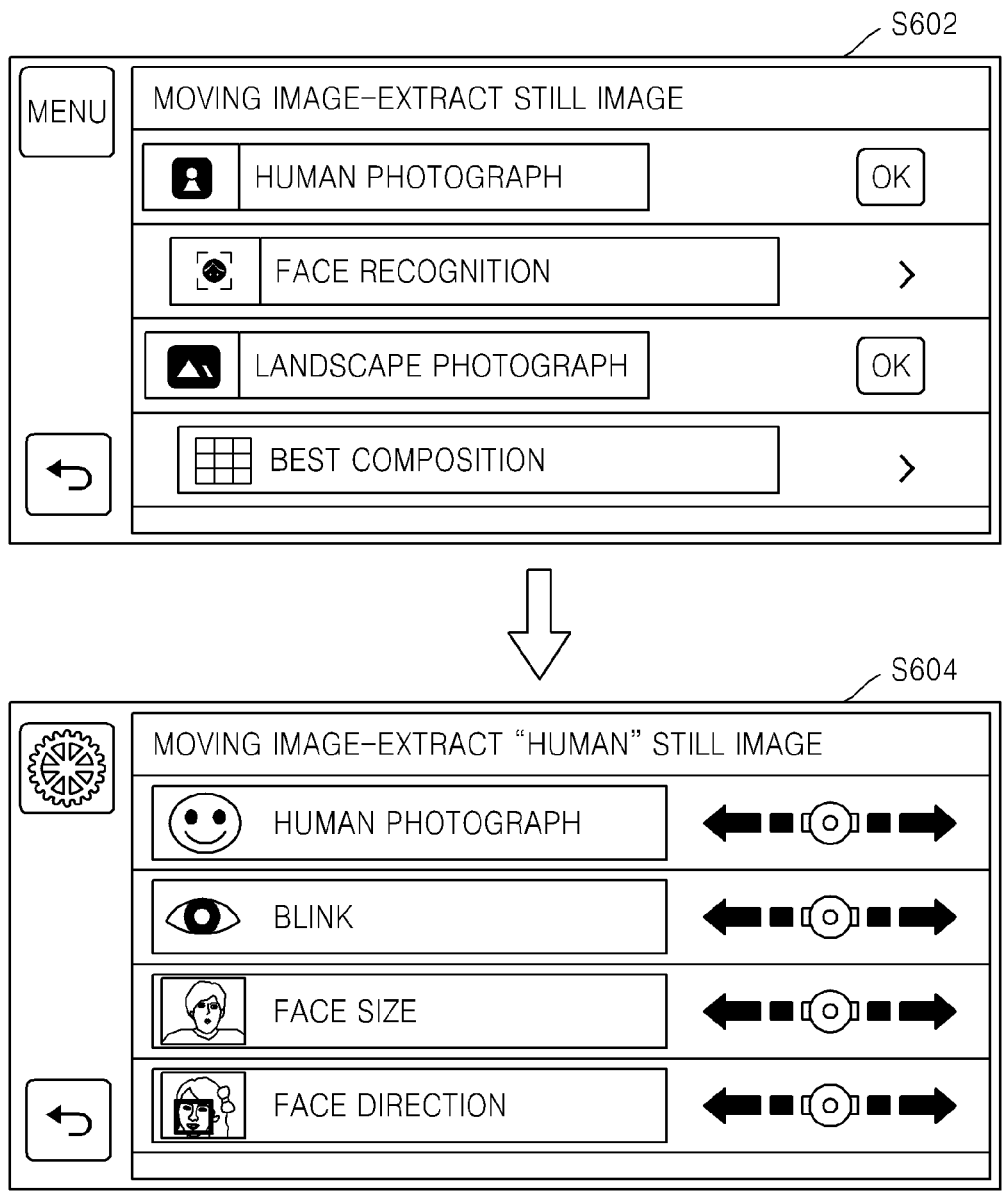
FIG. 6 is a diagram of a screen of a digital photographing apparatus, according to another embodiment.

FIG. 6 is a diagram of a screen of the digital photographing apparatus 100, according to another embodiment.

According to another embodiment, the still image capturing condition may include at least one of a face size, a face position, face expression, a face direction, and blink, or a combination thereof. To this end, as shown in FIG. 6, a user may select a photograph mode for capturing a still image of a face during photographing of a moving image (S602) and may set the still image capturing condition including at least one of a face size, a face position, face expression, a face direction, and blink, or a combination thereof (S604). For example, as shown in S604 of FIG. 6, a smiling degree (smile), a blink, a face size, a face direction, and the like may be set to set the still image capturing condition. According to an embodiment, the user may select at least one of parameters to be contained in the still image capturing condition, that is, a face size, a face position, face expression, a face direction, and blink.

Figure 7:
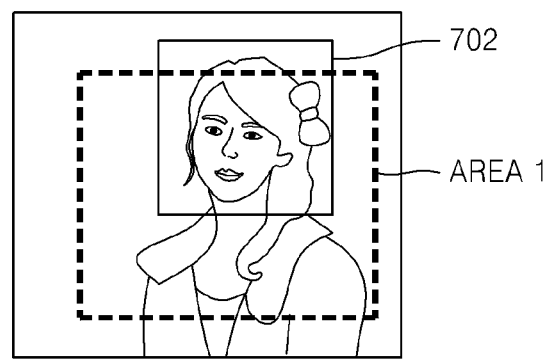
FIG. 7 is a diagram of a screen of a digital photographing apparatus, according to another embodiment.

FIG. 7 is a diagram of a screen of the digital photographing apparatus 100, according to another embodiment.

According to another embodiment, a face position may be set as one of the still image capturing condition. In this case, as shown in FIG. 7, a still image may be captured only when a face region 702 is positioned in a predetermined region AREA1.

According to another embodiment, the still image capturing condition may include face recognition information. For example, a user may input face information included in the still image capturing condition and the digital photographing apparatus 100 may capture the still image when a corresponding face is detected.

Figure 8:
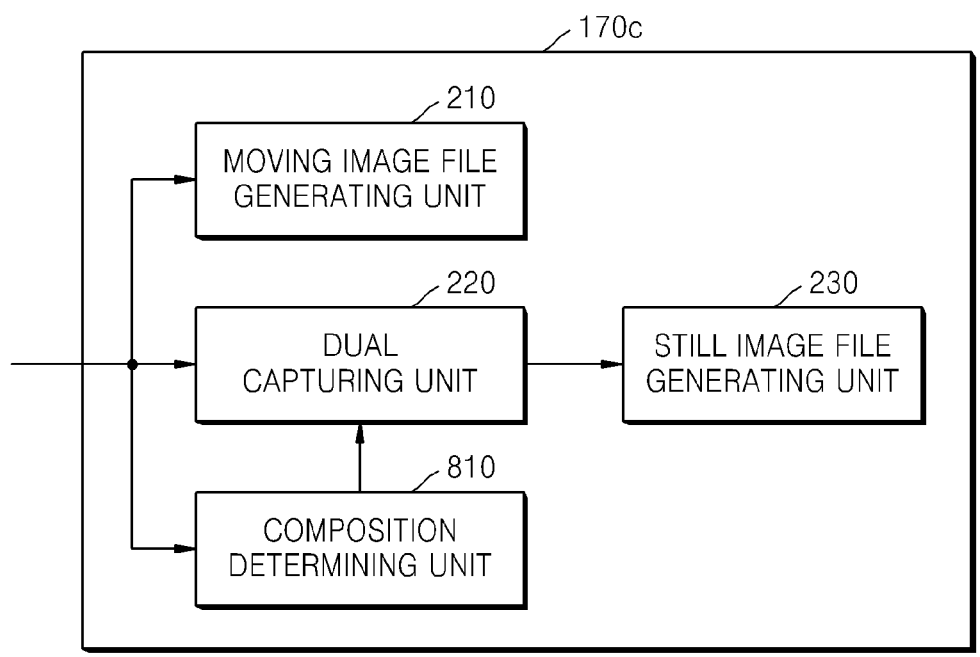
FIG. 8 is a block diagram of a CPU/DSP, according to another embodiment.

FIG. 8 is a block diagram of a CPU/DSP 170c, according to another embodiment. The CPU/DSP 170c according to the present embodiment includes the moving image file generating unit 210, the dual capturing unit 220, the still image file generating unit 230, and a composition determining unit 810.

According to another embodiment, the digital photographing apparatus 100 may analyze object composition from image data and may capture a still image when the object composition satisfies a composition condition included in the still image capturing condition.

The moving image file generating unit 210 may generate a moving image file from the imaging signal generated by the imaging device 118.

The dual capturing unit 220 sets the still image capturing condition according to a user's input and captures a still image when the still image capturing condition is satisfied during photographing of a moving image. According to another embodiment, the still image capturing condition may include a composition condition of the object. The composition condition may include, for example, any one of golden ratio composition, horizontal composition, vertical composition, vanishing point composition, 'S' shape composition, triangular composition, 'H' shape composition, symmetrical composition, circular composition, and inverse triangular composition, or a combination thereof. The golden ratio composition may be determined by using various methods such as a three-division method, a golden ratio method, a golden spiral method, a symmetrical method, and the like.

The composition determining unit 810 may determine whether the composition of the image data corresponding to the imaging signal satisfies the composition condition of the still image capturing condition.

According to the present embodiment, when composition that is desired by a user is detected, the digital photographing apparatus 100 may automatically capture a still image whereby the still image having the desired composition may be easily captured. In addition, according to the present embodiment, the desired composition may be accurately detected so as to capture a still image.

Figure 9:
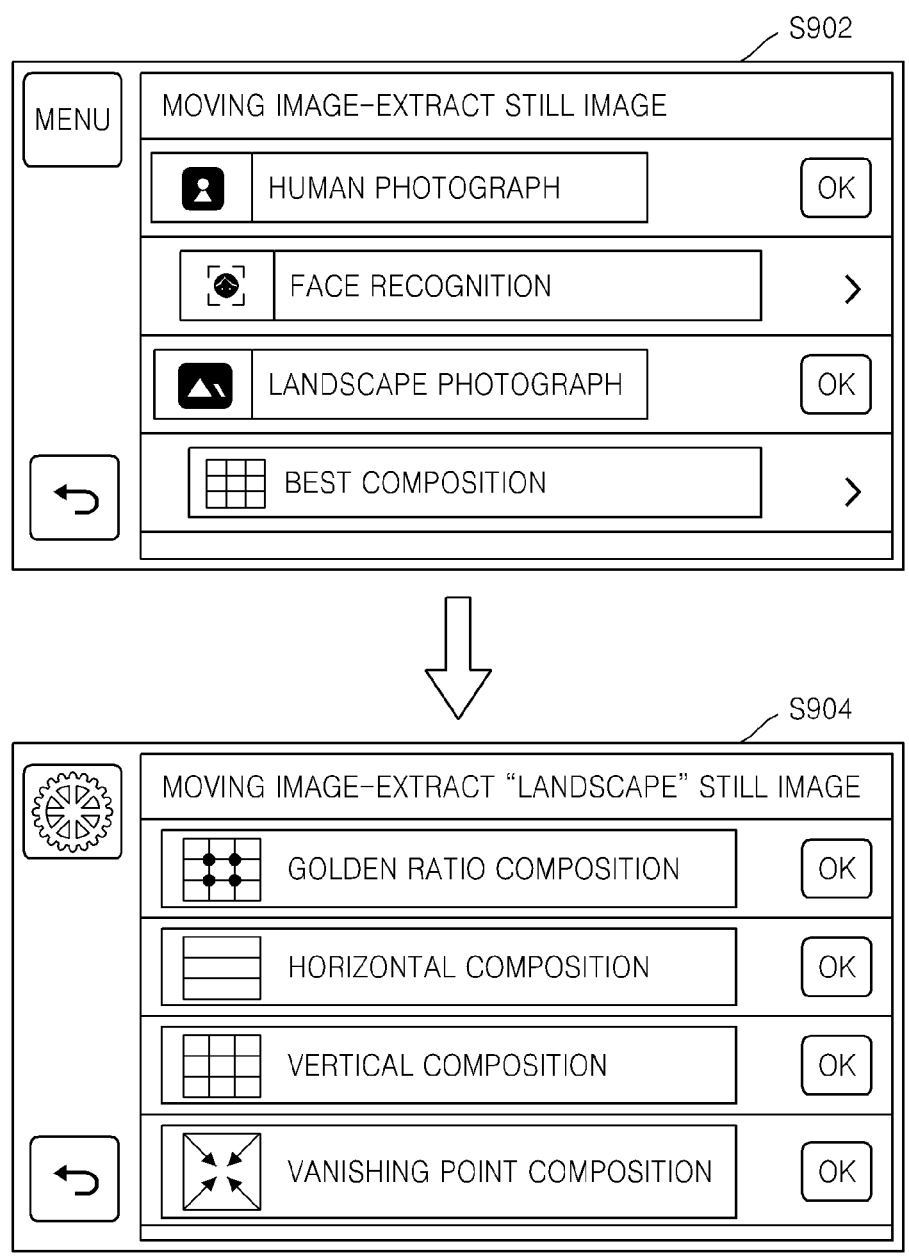
FIG. 9 is a diagram of a screen of a digital photographing apparatus, according to another embodiment.

FIG. 9 is a diagram of a screen of the digital photographing apparatus 100, according to another embodiment.

According to another embodiment, the still image capturing condition may include a composition condition. To this end, as shown in FIG. 9, a user may select a mode for capturing a landscape image during photographing of a moving image (S902) and may select a composition type of an object image (S904). The composition condition is set as the still image capturing condition in various modes such as a human photograph mode and a close-up photograph mode, as well as, a landscape photograph mode. In addition, the user may select only one composition as the still image capturing condition or may select a plurality of compositions. According to an embodiment, the user may freely set desired composition.

Figure 10:
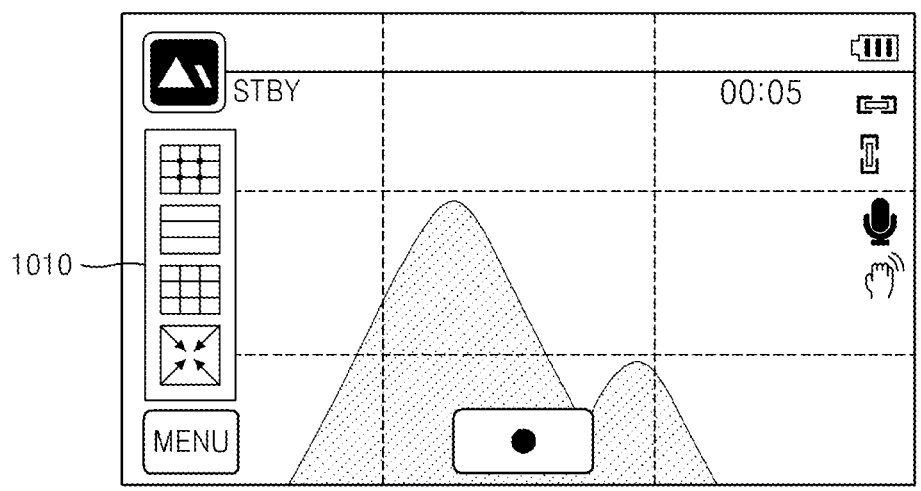
FIG. 10 is a diagram of a screen of a digital photographing apparatus, according to another embodiment.

FIG. 10 is a diagram of a screen of the digital photographing apparatus 100, according to another embodiment.

According to the present embodiment, while guide lines of compositions are previously shown to a user, the user may set a composition condition of the still image capturing condition. For example, as shown in FIG. 10, when the user selects desired composition in a selection region 1010, a guide line indicating a corresponding composition may be displayed on a preview screen.

According to an embodiment, the user may combine various still image capturing conditions, and for example, may select together a still image capturing condition related to a face and a still image capturing condition related to composition.

Figure 11:
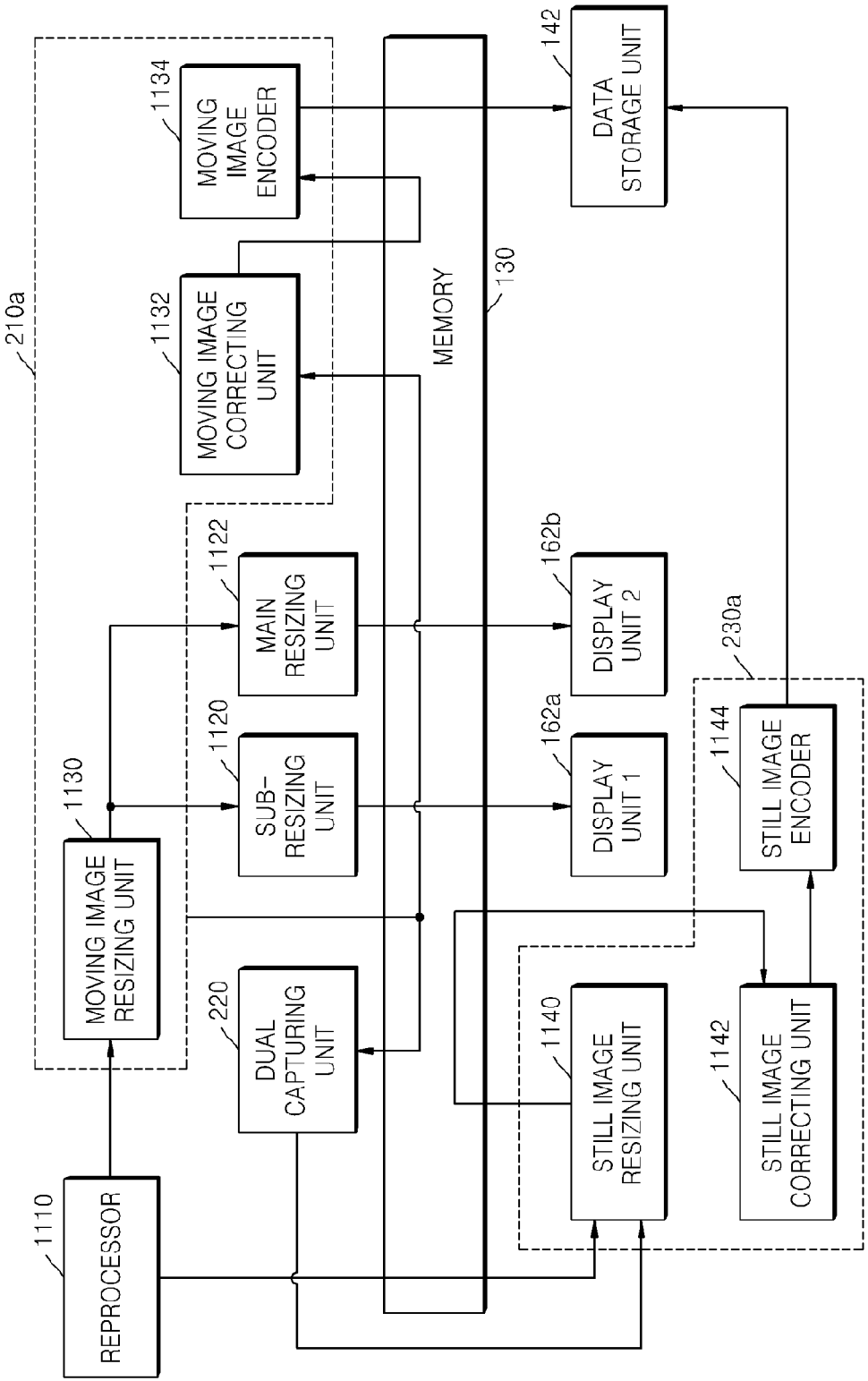
FIG. 11 is a block diagram of some elements of a digital photographing apparatus, according to another embodiment.

FIG. 11 is a block diagram of some elements of the digital photographing apparatus 100, according to another embodiment.

According to another embodiment, the CPU/DSP 170 may include a preprocessor 1110, a moving image file generating unit 210a, the dual capturing unit 220, a still image file generating unit 230a, a sub-resizing unit 1120, and a main resizing unit 1122. The moving image file generating unit 210a may include a moving image resizing unit 1130, a moving image correcting unit 1132, and a moving image encoder 1134. The still image file generating unit 230a may include a still image resizing unit 1140, a still image correcting unit 1142, and a still image encoder 1144.

The preprocessor 1110 receives a moving image frame corresponding to an imaging signal, performs correction processes such as detect removal, noise reduction, or the like, and transmits the processed moving image frame to the moving image resizing unit 1130. The moving image resizing unit 1130 resizes the moving image frame to have resolution of a moving image file. The moving image frame that is resized by the moving image resizing unit 1130 is temporally stored in the memory 130 and is transmitted to the moving image correcting unit 1132. The moving image frame corrected by the moving image correcting unit 1132 is transmitted to the moving image encoder 1134. The moving image encoder 1134 encodes moving image frames to generate a moving image file and outputs the moving image file through the memory 130 or outputs the moving image file directly to the data storage unit 142.

The dual capturing unit 220 determines whether image data of the moving image frame satisfies the still image capturing condition by using the moving image frame output from the moving image resizing unit 1130. When the still image capturing condition is satisfied, the dual capturing unit 220 controls the still image file generating unit 230a so as to capture a still image.

The still image resizing unit 1140 receives a capture image corresponding to an imaging signal from the preprocessor 1110 through the memory 130 and resizes the resolution of the still image when the dual capturing unit 220 determines that the moving image frame satisfies the still image capturing condition. The still image correcting unit 1142 performs processes such as noise removal, color interpolation, color improvement, definition adjustment, or the like on the resized capture image. The still image encoder 1144 generates a still image file by using the capture image that is corrected by the still image correcting unit 1142 and outputs the still image file to the data storage unit 142.

According to an embodiment, the digital photographing apparatus 100 may include a plurality of display units, for example, a display unit 1 162*a* and a display unit 2 162*b*. In this case, in order to resize and provide a moving image frame to have resolutions of the display unit 1 162*a* and the display unit 2 162*b*, the digital photographing apparatus 100 may further include the sub-resizing unit 1120 and the main resizing unit 1122. The sub-resizing unit 1120 resizes a moving image frame to have the resolution of the display unit 1 162*a* and provides the moving image frame to the display unit 1 162*a*. In addition, the main resizing unit 1122 resizes a moving image frame to have the resolution of the display unit 2 162*b* and provides the moving image frame to the display unit 2 162*b*. For example, the display unit 1 162*a* is an auxiliary display unit that is disposed on a front surface of the digital photographing apparatus 100 and the display unit 2 162*b* may be a main display unit that is disposed on a rear surface of the digital photographing apparatus 100.

According to the present embodiment, when a still image is captured, the still image may be captured from an imaging signal prior to resizing the still image to have resolution of a moving image file, thereby obtaining a still image having high quality.

In FIG. 11, the feature of transmitting data through the memory 130 may be substituted with the feature of using an on-the-fly method. On the other hand, the feature of transmitting the on-the-fly method may be substituted with the feature of transmitting data through the memory 130.

Figure 12:
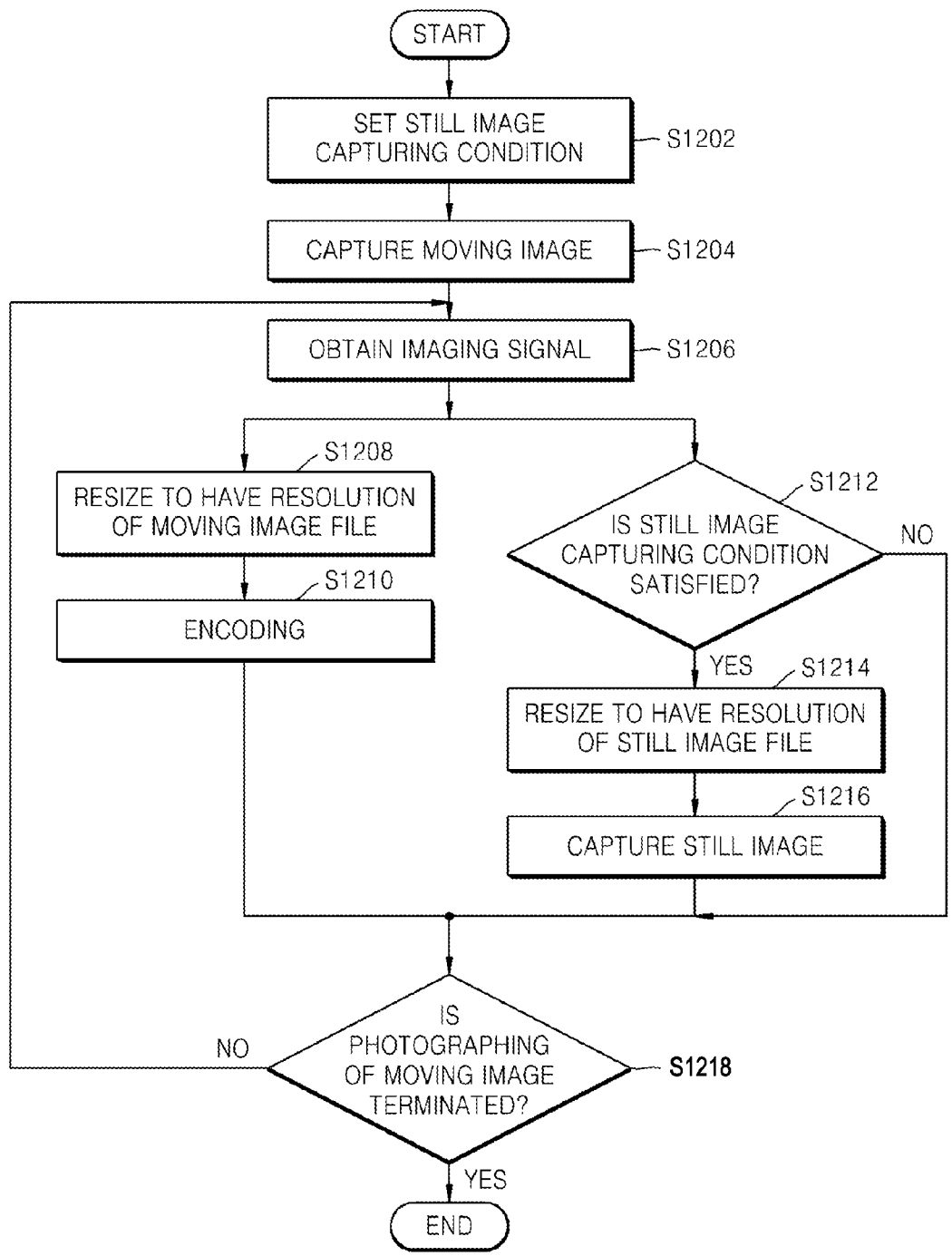
FIG. 12 is a flowchart of a method of controlling a digital photographing apparatus, according to another embodiment.

FIG. 12 is a flowchart of a method of controlling a digital photographing apparatus, according to another embodiment.

According to another embodiment, a still image capturing condition is set according to a user's input (S1202). Then, when moving-image photographing begins (S1204), an imaging signal is obtained (S1206) and a moving image generating process and a still image capturing process are performed together. The imaging signal is resized to have resolution of a moving image file to generate a moving image frame (S1208) and moving image frames are encoded according to a moving image compression standard (S1210) to generate a moving image file. Whether input image data satisfies a still image capturing condition by using the imaging signal or the moving image frame is determined (S1212). When the still image capturing condition is satisfied, the imaging signal is resized to have resolution of a still image file (S1214) and the still image is captured (S1216). Operations S1214 and S1216 are repeated until moving-image photographing is terminated (S1218).

Figure 13:
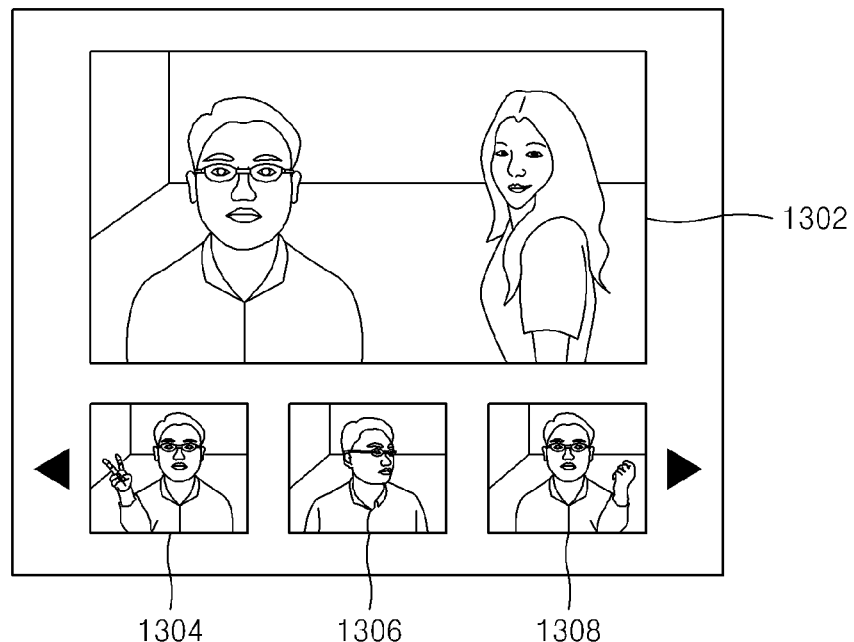
FIG. 13 is a diagram of a screen of a digital photographing apparatus, according to another embodiment.

FIG. 13 is a diagram of a screen of the digital photographing apparatus 100, according to another embodiment.

According to another embodiment, still images 1304, 1306, and 1308 that are captured as satisfying a still image capturing condition during photographing of a moving image may be displayed together with a screen 1302 of a moving image. Due to this configuration, a user may easily view still images that are captured together with a moving image.

Figure 14:
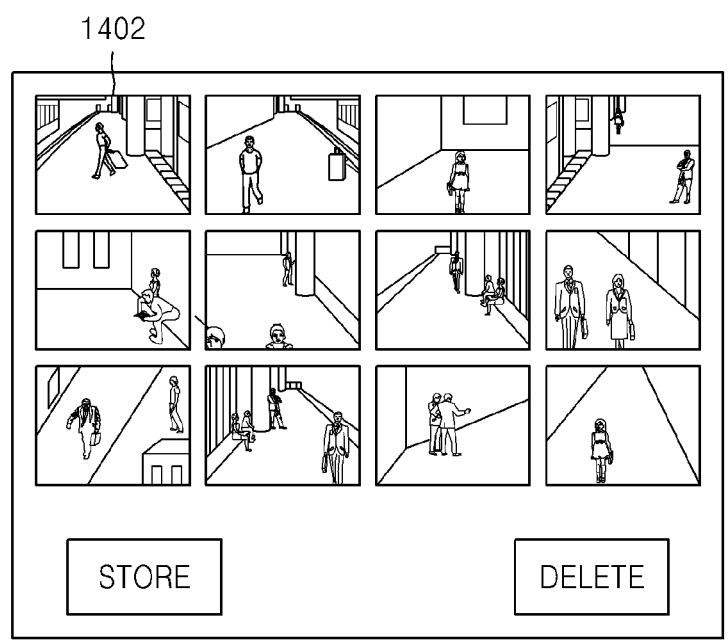
FIG. 14 is a diagram of a screen of a digital photographing apparatus, according to another embodiment.

FIG. 14 is a diagram of a screen of the digital photographing apparatus 100, according to another embodiment.

According to another embodiment, still images that are captured during photographing of a moving image may be temporally stored and then only a still image that is selected by a user may be generated as a still image file, and the still image file is stored after moving-image photographing is terminated. For example, as shown in FIG. 14, when moving-image photographing is terminated, still images that are captured together with a moving image are provided in the form of a thumbnail 1402 and only a still image that is selected by the user may be selectively stored from among the still images.

Figure 15:
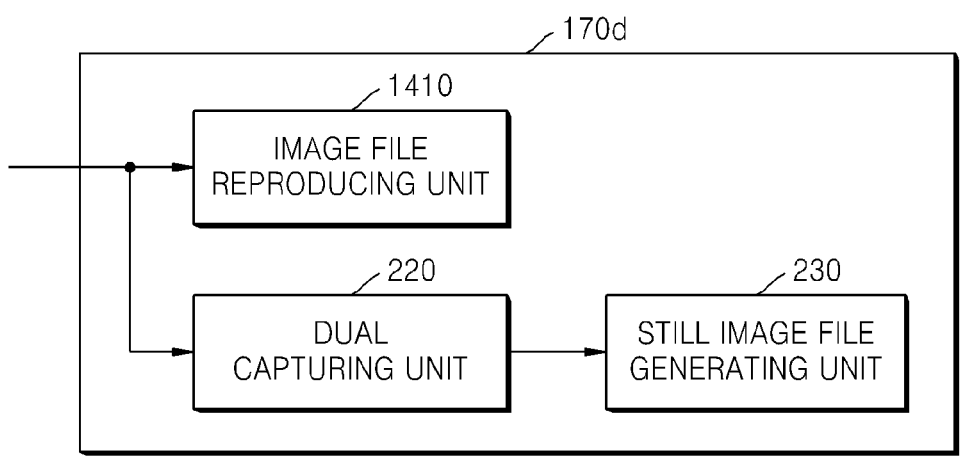
FIG. 15 is a block diagram of a CPU/DSP, according to another embodiment.

FIG. 15 is a block diagram of a CPU/DSP 170*d*, according to another embodiment. The CPU/DSP 170*d* may be used in a general image process apparatus as well as in a digital photographing apparatus. Thus, according to the present embodiment, the CPU/DSP 170*d* is not limited to the configuration of FIG. 15 and may be used in various types of image processing apparatuses such as computers, cellular phones, portable multimedia players (PMPs), or the like. According to the present embodiment, some elements such as the photographing unit 110, the analog signal processor 120, and the like may be omitted.

The CPU/DSP 170*d* according to the present embodiment includes a moving image file playing unit 1410, the dual capturing unit 220, and the still image file generating unit 230.

The moving image file playing unit 1410 decodes a moving image file stored in the data storage unit 142 and plays the decoded moving image file on the display unit 164. To this end, the moving image file playing unit 1410 may play the moving image file by using a codec corresponding to a compression standard of a moving image file, may obtain moving image frames, and may display the moving image frames. In addition, the moving image file playing unit 1410 provides the moving image frames obtained by decoding the moving image file to the dual capturing unit 220.

The dual capturing unit 220 captures a still image corresponding to a moving image frame when the moving image frames provided from the moving image file playing unit 1410 satisfy a still image capturing condition. In addition, the dual capturing unit 220 may set the still image capturing condition according to a user's input. The still image capturing condition may be a condition based on, for example, an object type, an object shape, object composition, an object color, object brightness, and the like. The dual capturing unit 220 automatically captures a still image when image data of the moving image frame satisfies the still image capturing condition, even if a predetermined control signal for capturing the still image is not input.

According to the present embodiment, as described above, the dual capturing unit 220 may also continually capture a plurality of still images. In addition, according to the present embodiment, the still image capturing condition may also include, for example, a condition related to a face, a composition condition, or a combination thereof, as described above.

The still image file generating unit 230 generates a still image file from the still image captured by the dual capturing unit 220. According to an embodiment, the still image captured by the dual capturing unit 220 is temporally stored in the memory 130 (refer to FIG. 1) and then the still image file may be generated after playing of a moving image is terminated. According to another embodiment, when the dual capturing unit 220 captures a still image, the still image file generating unit 230 may directly generate a still image file during playing of a moving image. The still image file generating unit 230 may store the still image file in the data storage unit 142 (refer to FIG. 1).

Figure 16:
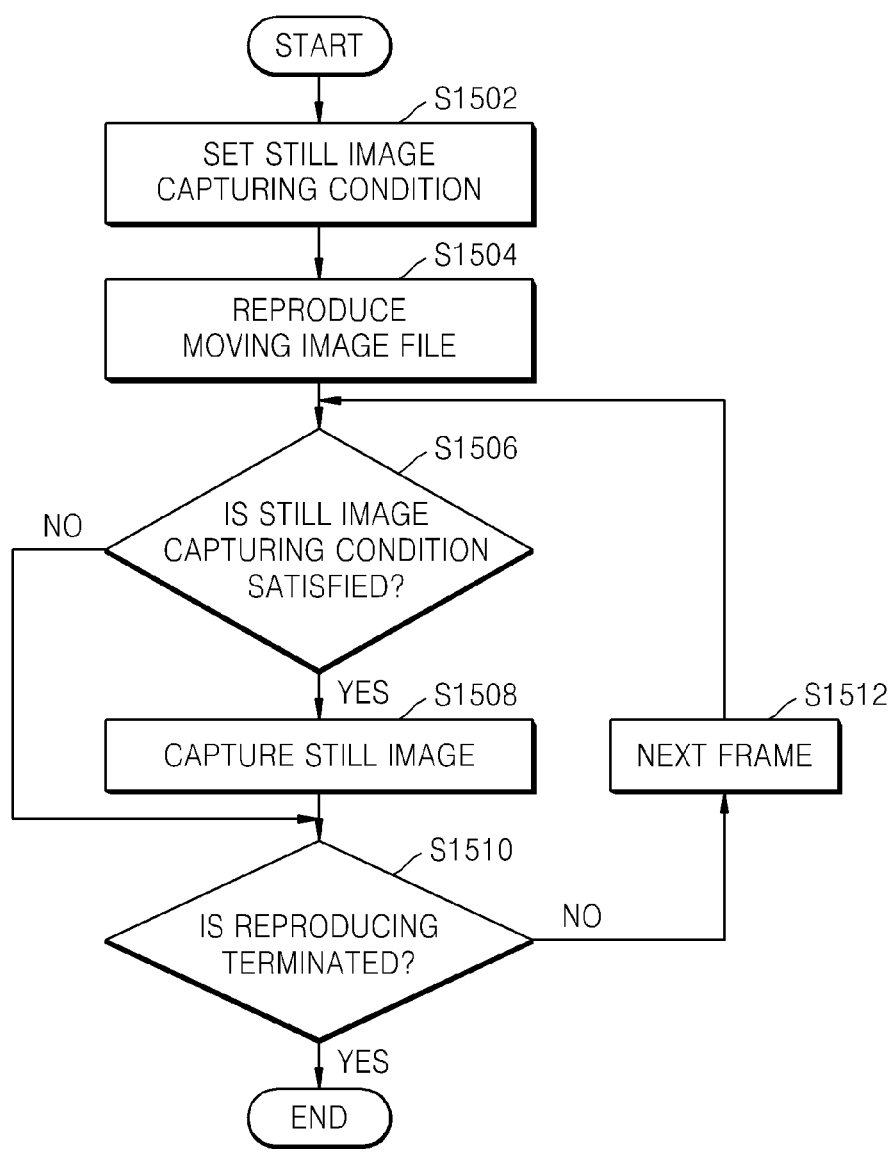
FIG. 16 is a flowchart of a method of processing an image, according to another embodiment.

FIG. 16 is a flowchart of a method of processing an image, according to another embodiment.

In the method according to the present embodiment, a still image capturing condition is set according to a user's input (S1502). Then, when playing of a moving image file begins (S1504), whether image data of a moving image frame satisfies a still image capturing condition is determined (S1506). When the moving image frame satisfies the still image capturing condition, a still image is captured from the moving image frame (S1508). Operations S1506 and S1508 are repeated until the playing of a moving image is terminated (S1510) and may be performed on a moving image frame-by-moving image frame basis (S1512).

According to the above-described embodiments of the invention, a still image that is desired by a user may be captured even if the user does not input a predetermined control signal during photographing of a moving image or playing of the moving image.

In addition, according to the above-described embodiments of the invention, a user may actively set a condition for capturing a still image from a moving image.

The invention can also be embodied as computer readable codes on a non-transitory computer readable recording medium. The computer readable recording medium is any data storage device that can store data that can be thereafter read by a computer system.

The computer readable codes may implement the operations of a method of controlling a digital photographing apparatus and an image processing method according to the present disclosure when read from the computer readable recording medium and executed by a processor (for example, by the CPU/DSP 170, 170a, 170b, 170c, or 170d). These computer readable codes may be implemented in any of a variety of programming languages. Also, functional programs, codes, and code segments for accomplishing the present invention can be easily construed by programmers skilled in the art to which the present invention pertains.

Examples of the non-transitory computer readable recording medium include read-only memory (ROM), random-access memory (RAM), CD-ROMs, magnetic tapes, floppy disks, optical data storage devices, and the like. The computer readable recording medium can also be distributed over network coupled computer systems so that the computer readable code is stored and executed in a distributed fashion.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another.

Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus, the method comprising:
    setting a still image capturing condition comprising at least one of a face direction, a face position, a face expression, and a blink;
    photographing a moving image; and
    capturing a still image when the face is detected during photographing of the moving image and the still image capturing condition is satisfied.

2. The method of claim 1, wherein:
    the still image capturing condition comprises whether a face is detected or not, and
    the method of controlling the digital photographing apparatus further comprises detecting the face from each of a plurality of moving image frames during photographing of the moving image.

3. The method of claim 1, wherein:
    the still image capturing condition comprises object composition,
    the method of controlling the digital photographing apparatus further comprises determining whether composition of an object from each of a plurality of moving image frames satisfies a composition set in the still image capturing condition during photographing of the moving image, and
    the capturing of the still image comprises capturing the still image when the composition of the object from at least one of the plurality of moving image frames satisfies the composition set in the still image capturing condition.

4. The method of claim 1, wherein:
    the capturing of the moving image comprises:
        resizing an imaging signal generated by an imaging device to have a resolution of a moving image file; and
        generating the moving image file from the imaging signal that is resized to have the resolution of the moving image file, and
    the capturing of the still image comprises:
        resizing the imaging signal to have a resolution of a still image file; and
        generating the still image file from the imaging signal that is resized to have the resolution of the still image file.

5. The method of claim 1, further comprising:
    temporally storing the captured still image;
    when the moving image photographing is terminated, displaying the still image that is temporally stored; and
    generating and storing a still image file for storing the still image that is temporally stored, according to user's selection.

6. A digital photographing apparatus comprising:
    an imaging device that photoelectrically transforms incident light to generate an imaging signal;
    a moving image file generating unit that generates a moving image file from the imaging signal;
    a dual capturing unit that sets a still image capturing condition comprising at least one of a face direction, a face position, a face expression, and a blink, and captures a still image when the face is detected during photographing of the moving image corresponding to the moving image file and the still image capturing condition is satisfied.

7. The digital photographing apparatus of claim 6, wherein:
    the still image capturing condition comprises whether a face is detected or not, and
    the digital photographing apparatus further comprises a face detecting unit that detects the face from each of a plurality of moving image frames during photographing of the moving image.

8. The digital photographing apparatus of claim 6, wherein:
    the still image capturing condition comprises object composition,
    the digital photographing apparatus further comprises a composition determining unit that determines whether composition of an object from each of a plurality of moving image frames satisfies a composition set in the still image capturing condition during photographing of the moving image, and
    the dual capturing unit captures the still image when the composition of the object from at least one of the plurality of the moving image frames satisfies the composition set in the still image capturing condition.

9. The digital photographing apparatus of claim 6, wherein the moving image file generating unit resizes the imaging signal generated by the imaging device to have a resolution of the moving image file and generates the moving image file from the imaging signal that is resized to have the resolution of the moving image file, and
    wherein the dual capturing unit resizes the imaging signal to have a resolution of a still image file and generates the still image file from the imaging signal that is resized to have the resolution of the still image file.

10. The digital photographing apparatus of claim 6, further comprising:
    a memory that temporally stores the captured still image;
    a display unit that, when the moving image photographing is terminated, displays the still image that is temporally stored;
    a still image file generating unit that generates a still image file for storing the still image that is temporally stored, according to user's selection; and
    a data storage unit that stores the still image file.

11. A non-transitory computer readable recording medium executed by a processor and having recorded thereon a program for executing a method of controlling a digital photographing apparatus, the controlling method comprising:

setting a still image capturing condition comprising at least one of a face direction, a face position, a face expression, and a blink;

photographing a moving image; and capturing a still image when the face is detected during photographing of the moving image and the still image capturing condition is satisfied.

12. A method of processing an image, the method comprising:

setting a still image capturing condition comprising at least one of a face direction, a face position, a face expression, and a blink;

playing a moving image file; and when the face is detected during the playing of the moving image file and the still image capturing condition is satisfied, generating a still image file from a moving image frame of the moving image.

13. The method of claim 12, wherein the method of processing an image further comprises detecting a face from each of a plurality of moving image frames during the playing of the moving image file.

14. The method of claim 12, wherein:

the still image capturing condition comprises object composition, the method of processing the image further comprising determining whether composition of an object from each of a plurality of moving image frames satisfies a composition set in the still image capturing condition during the playing of the moving image file, and the generating of the still image file further comprises capturing a still image when the composition of the object from at least one of the plurality of moving image frames satisfies the composition set in the still image capturing condition.

15. An apparatus for processing an image, the apparatus comprising:

a moving image file reproducing unit that decodes and plays a moving image file;

a dual capturing unit that sets a still image capturing condition comprising at least one of a face direction, a face position, a face expression, and a blink, and captures a still image when the face is detected during the playing of the moving image file and the still image capturing condition is satisfied.

16. The apparatus of claim 15, wherein the apparatus further comprises a face detecting unit that detects a face from each of a plurality of moving image frames during the playing of the moving image file.

17. The apparatus of claim 15, wherein:

the still image capturing condition comprises object composition, the apparatus further comprises a composition determining unit that determines whether composition of an object from each of a plurality of moving image frames satisfies a composition set in the still image capturing condition during the playing of the moving image file, and the dual capturing unit captures the still image when the composition of the object from at least one of the plurality of moving image frames satisfies the composition set in the still image capturing condition.

18. A non-transitory computer readable recording medium executed by a processor and having recorded thereon a program for executing a method of processing an image, the image processing method comprising:

setting a still image capturing condition comprising at least one of a face direction, a face position, a face expression, and a blink;

playing a moving image file; and generating a still image file from a moving image frame of the moving image file when the face is detected during the playing of the moving image file and the still image capturing condition is satisfied.

* * * * *